Dec. 14, 1971     J. B. PIERCE     3,626,604

THREE-DIMENSIONAL CHEMICAL MODELS

Filed June 23, 1969     3 Sheets-Sheet 1

INVENTOR
JAMES B. PIERCE

BY

*Pearson + Pearson*

ATTORNEYS

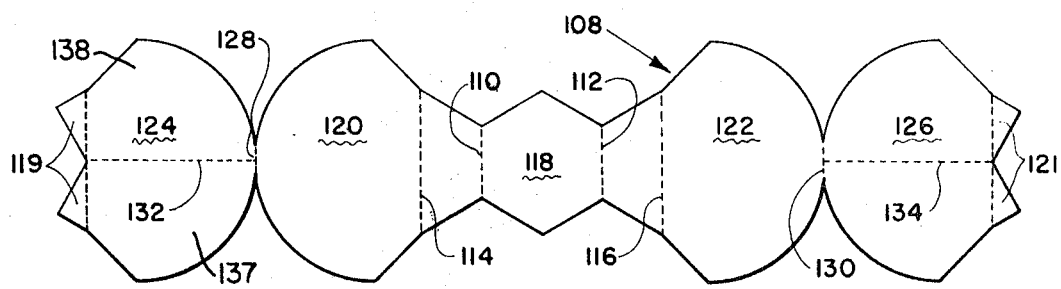
Fig. 7
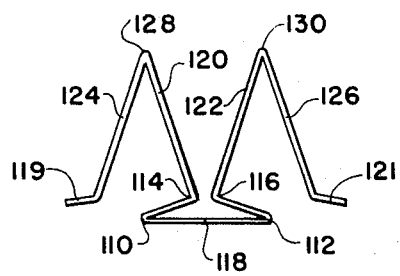
Fig. 8
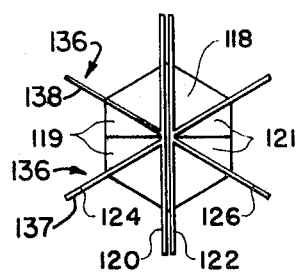
Fig. 9
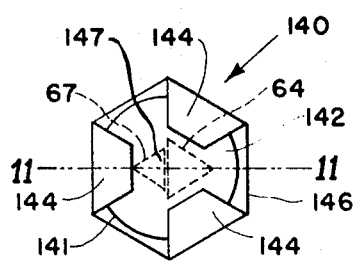
Fig. 10
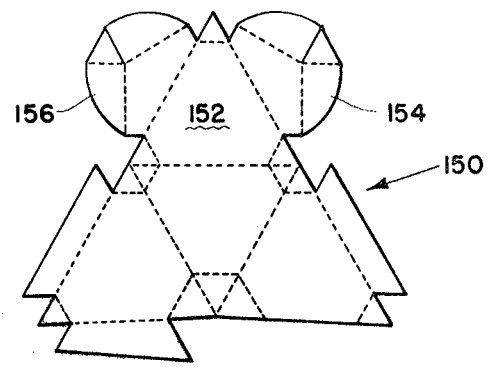
Fig. 12
Fig. 11
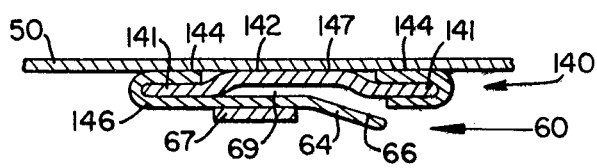

Dec. 14, 1971  J. B. PIERCE  3,626,604
THREE-DIMENSIONAL CHEMICAL MODELS
Filed June 23, 1969  3 Sheets-Sheet 3

INVENTOR
JAMES B. PIERCE
BY
Pearson + Pearson
ATTORNEYS

United States Patent Office 3,626,604
Patented Dec. 14, 1971

3,626,604
THREE-DIMENSIONAL CHEMICAL MODELS
James B. Pierce, 147 Old Westford Road,
Chelmsford, Mass. 01824
Filed June 23, 1969, Ser. No. 835,459
Int. Cl. G09b 23/26
U.S. Cl. 35—18 A
10 Claims

ABSTRACT OF THE DISCLOSURE

Models of atoms, molecules and radicals which may be made, transported and stored in flat, planar, sheet form, and which may be foldably erected rapidly and conveniently into three-dimensional, spatially-representative chemical models. Fastening tabs are adhered, or affixed, so that each model is a rigid, non-collapsible, shell-like structure. Attachment tongues bent slightly out of the plane of the sheet material to form tongue receiving pockets thereunder permit models to be detachably and slidably affixed to each other. A particular feature of the invention is that by which stearic hindrance and other space-dependent phenomena can be represented by use of a novel rotatable fastening element.

BACKGROUND OF THE INVENTION

There has been a need for improved apparatus whereby chemical configurations, i.e. atoms, molecules and radicals, can be represented in stereochemical relationship to one another. One of the most desired improvements was apparatus having sufficiently inexpensive construction that it could be made available to the individual student. Heretofore such apparatus, for example, the snap-festened plastic balls, has been so expensive that its use has been largely confined to use in expositions to students by a lecturer or use by commercial laboratories.

However, it should be recognized that attempts to provide more economical systems should not lead one to abandon the following characteristics of the more expensive chemical model systems:

(1) Proper bond angles between various atoms and/or radicals, (2) Representative size variation between different atoms and/or radicals and/or molecules, (3) Rotatable connections at the bond of one configuration to another in instances when such rotation is indicative of the actual nature of the bond.

There have been a number of efforts to achieve such improved systems in the past. Some of these efforts, e.g. that described in U.S. Pat. 480,275 to Osorio, far predate the existence of the above-mentioned plastic ball-type system. Other such efforts, e.g. that described in U.S. Pat. 3,313,042 to Larson were made after the introduction of the plastic ball system and are attempts to achieve as many of the advantages of the plastic ball-system as can be achieved at cost level consistent with the avowed object of putting the newer model systems into the hands of each student. Nevertheless, all previous efforts have been such that the student attempting to use them was left a considerable amount of abstract extrapolation to do before he could picture the chemical properly. In large part, the problem seemed to be that none of these workers in the prior art fully accepted the challenge of constructing a true three-dimensional system of stereomodels.

SUMMARY OF THE INVENTION

Therefore, it is a primary object of the invention to provide three-dimensional molecular models of sheet material having integral sheet-like tongues slidable under corresponding tongues for detachable connection of one model to another.

It is a further object of the invention to provide a system of two-dimensional blanks suitable for assembly into various chemical configurations.

It is another object of the invention to provide a novel means for fastening various chemical configurations together by the use of flat, planar tongues of sheet material.

Another object of the invention is to provide a novel means for rotatably fastening various chemical configurations together by the use of said flat planar tongues on a flat planar retainer element, which rotates on a flat planar disc.

Other objects of the invention will be obvious to those skilled in the art on reading the instant application.

The above objects have been substantially achieved by the construction of a system whereby blanks are formed on a two-dimensional sheet, such as a light plastic or paper sheet, in such size and shape that they may be readily assembled into three-dimensional stereochemical models. By "blank" is meant a two-dimensional sheet-like form which is suitable for formation into a three-dimensional object by appropriate folding and fastening steps. This term "blank" is borrowed from the paper box industry.

The stereo models of the invention include box-like configurations having a plurality of faces. In appropriate circumstances, the stereo models comprise a single disc-like member and a finned surface thereon. Depending on the particular chemical, some faces of the box-like configurations will also include outwardly projecting fins thereon or means for receiving and holding a second said stereo model thereon. The finned surfaces comprise a plurality of fins and thereby form a spatially and visually adequate representation of the space that is occupied by a given molecular configuration.

The fastening means which form means for receiving and holding stereo models together, e.g. for holding each hydrogen atom model on an oxygen atom model to represent $H_2O$, is conveniently formed by one face, a second sheet attached to said face, a slot in said second sheet forming means to insert a tab or tongue of the adjoining face of another model into a pocket formed between the second sheet and said face. The slot can be, conveniently, in the shape of the perimeter of a tongue or tab which is cut into the second sheet and is adapted to fit into a pocket on the adjoining face of another model.

When it is desired to have a rotatable connection between two models, a disk is inserted between the face of a model and the slot-carrying sheet. This disk is attached to the face in such a way that tabs on the sheet may be slidably fitted between the disk and face providing guide means for rotating the sheet.

A stereo model system according to the present system would advantageously comprise models representing the common atoms, such as oxygen, carbon, nitrogen, hydrogen, sulfur, phosphorous, and the like. Atoms which appear in nature exhibiting various characteristics depending on their molecular environment are desirably represented by models of different forms. For example, nitrogen can be modeled in the trigonal and tetrahedral forms; carbon can be modeled in the trigonal, tetrahedral and linear forms, and so forth.

ILLUSTRATIVE EXAMPLES OF THE INVENTION

In this application and accompanying drawings, there is shown and described a preferred embodiment of the invention and various alternatives and modifications thereof are suggested, but it is to be understood that these are not not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

In the drawings:

FIG. 7 is a blank from which a monovalent oxygen atom model may be formed according to the invention.

FIG. 8 is a side view of a partially assembled monovalent oxygen atom model formed according to the invention.

FIG. 9 is a top view of the monovalent oxygen model assembled from the blank shown in FIG. 7.

FIGS. 10 and 11 show a bottom view and section of a rotatable fastening means according to the invention.

FIG. 12 is a plan view of a blank suitable for construcing a pyramidal nitrogen atom.

In the description of the various flat blanks die cut from sheets of low cost material, such as cardboard, I use the term "score lines" to mean "fold lines" whether the line is prefolded, pre-pressed, scored, perforated, or merely marked in ink on the blank.

Figure 1:
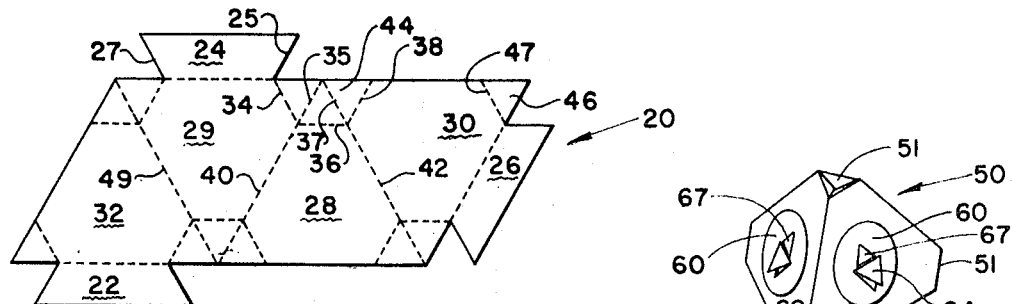
FIG. 1 is a sheet marked with appropriate fold or score lines for folding into a tetrahedral atomic configuration according to the invention.

Referring to FIG. 1, it is seen that a blank 20 may be cut from a flat sheet and formed into a tetrahedron as follows:

After the blank is free along its perimeter, it is folded with the object of bringing tabs 22, 24 and 26 into contact with the inside faces of hexagonal panels 28, 30 and 32 respectively. In achieving this, the triangular panels defined by the score lines 34, 35, 36, 37 and 38 are all bent inwardly. This causes panels 29 and 30 to fold on score lines 40 and 42 and brings edge 25 of tab 24 in between triangular panel 44 and hexagon panel 30. Edge 27 of tab 24 is then overlapped by triangular tongue 46, bent along score line 47, and is thereby being held against hexagonal panel 30.

Next the blank is bent inwardly around score line 49.

Figure 2:
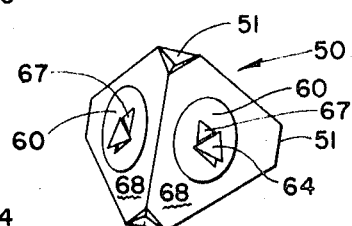
FIG. 2 is a perspective view of the tetrahedral configuration formed from the sheet of FIG. 1.

Then tabs 22 and 26 are bent inwardly and the blank is folded along score line 49 to bring tabs 22 and 26 alongside hexagonal panels 28 and 32 respectively. Then it is only necessary to tuck the remaining triangular panels into the resulting box, which is substantially shaped as a tetrahedron. The result, as seen in FIG. 2, is a substantially tetrahedral box 50, with a "hole" 51 at each corner, representing tetrahedral carbon and formed as a consequence of the triangular tabs being forced into the box to hold tabs 22, 24 and 26 in place against the indicated hexagonal panels.

On reading this disclosure, those skilled in the art will realize that similar construction can be used for making other tetrahedral models, for example, tetrahedral nitrogen and sulfur.

Figure 3:
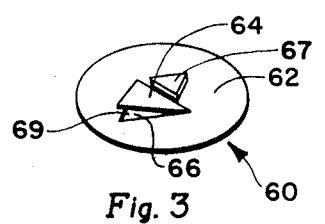
FIG. 3 is perspective view of a fastening means useful in forming configurations according to the invention.

Referring to FIG. 3, attachment means 60 comprises a disk 62 with a flat, planar integral triangular tongue, or tab, 64 cut out by an angular slit, thereby forming a triangular recess 66 having a 60° angle therein. A triangular cleat 67 may be adhered as shown to disk 62, or formed therein, to increase the frictional pressure on the tongue of another model slidably received under tongue 64. Attachment means 60 can be attached to each face 68 of a three dimensional figure, such as the tetrahedron 50, preferably by gluing just along the outside perimeter of the disc 62 leaving an unadhered central area thereunder. If this is done, a space, or tongue-receiving pocket, 69, will remain between the face 68 of the tetrahedron and the disc 62 of attachment means 60, so that the triangular tongue of one model will enter the tongue slit and recess of the other model, under the tongue thereof, and penetrate into the pocket 69 while the tongue of the other model is also detachably and slidably penetrated into the pocket of the said one model.

Figure 4:
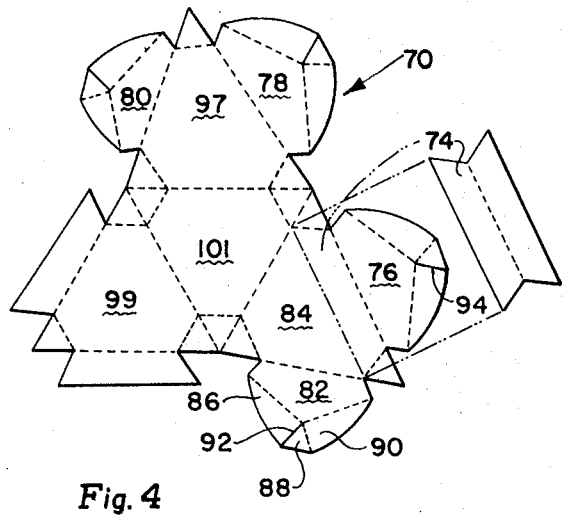
FIG. 4 is a blank marked with appropriate fold or score lines for folding into a divalent tetrahedral atomic configuration according to the invention.
Figure 6:
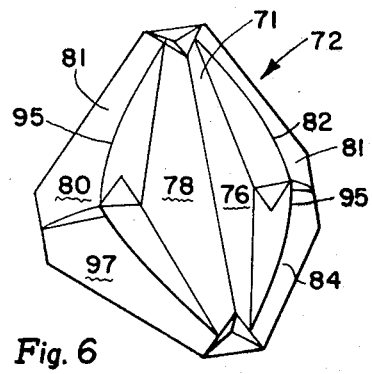
FIG. 6 is a perspective view of the completed configuration assembled from the sheet blank of FIG. 4.

Referring to FIG. 4, there is seen another blank 70, which is illustrative of those blanks adapted to fold into a model 72 having a finned surface 71, best seen in FIG. 6. Blank 70 is for constructing a divalent sulfur model, a diagonal oxygen model, or the like.

Figure 5:
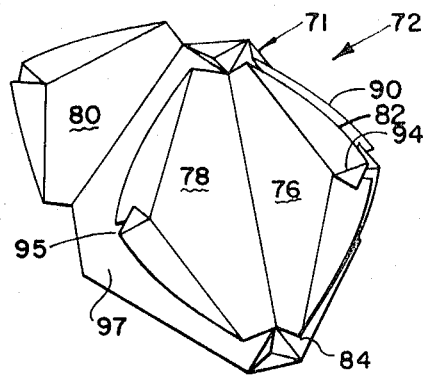
FIG. 5 is a perspective view of the partially-arranged divalent configuration assembled from the blank of FIG. 4.

Blank 70 is formed into a tetrahedron-shaped box 72 by the general procedure followed in assembling the blank of FIG. 1 into the tetrahedron of FIG. 2. It is usually desirable to cut out and attach a third large tab 74 beneath panel 84, as shown, before forming the tetrahedral box 72. However, as shown in FIG. 5, projecting panels 76, 78, 80 and 82 remain on the box 72. These panels are used to form finned surfaces 81, as follows:

Panels 76 and 82 are folded back over hexagonal panel 84 but the flap sections 86, 88 and 90 are bent upwardly so that they form fins. Score lines 92 and 94 are cut so that small triangular panels can form tabs to help lock the fins 95 into place as is seen in FIG. 6. Finned surfaces 81 are an excellent practical means of representing an effective radius of a particular atom or molecule. To finish the divalent sulfur atom, projecting panels 80 and 78 are similarly arranged to form projecting panels on hexagonal panel 97, and fastening means of the type shown in FIG. 3 are mounted on the two panels (which do not appear in FIGS. 5 and 6) for attaching other atomic configurations.

Referring to FIG. 7, a blank 108 of a monovalent oxygen atom model, it is seen that the blank is folded upwardly along score lines 110 and 112 and outwardly along score lines 114 and 116. Next score lines 114 and 116 are brought together proximate the surface of hexagonal-shaped panel 118. Panels 120 and 122 may be brought together after end tabs 119 and 121 are bent outwardly. Panels 124 and 126 are pivoted 180 degrees downwardly along the narrow webs at pivot points 128 and 130, respectively. Next panels 124 and 126 are bent midway along the now vertical score lines 132 and 134, so that each half panel 137 and 138 of each of panels 124 and 126 form fins 136 as seen in FIG. 9. Tabs 119 and 121 are glued or otherwise attached to hexagonal base panel 118 and panels 120 and 122 may be fastened by any convenient means to add rigidity to the model.

FIGS. 10 and 11 show a rotatable attachment means 140 comprising a base disk 142 which is normally attached centrally by adhesive to the face of a stereo model in such a way that the perimeter 141 of disk 142 is left free to receive three tabs 144 arranged at 120-degree angles from each other on a second disk 146, which, except for the presence of tabs 144, is essentially the same type of fastener as shown in FIG. 3. This arrangement allows the free rotation of disk 146, and, of course, the rotation of any model mounted on any face to which fastening means 140 is attached, for example, as by glue to the central area 147 of disk 142.

FIG. 12 is a blank 150 for forming a tetrahedral model having one finned surface such as would represent, for example, a pyramidal nitrogen model. The model is formed similarly to that formed from blank 70 of FIG. 4. The finned surface is formed by hexagonal panel 152 and fin panel assemblies 154 and 156.

Figure 13:
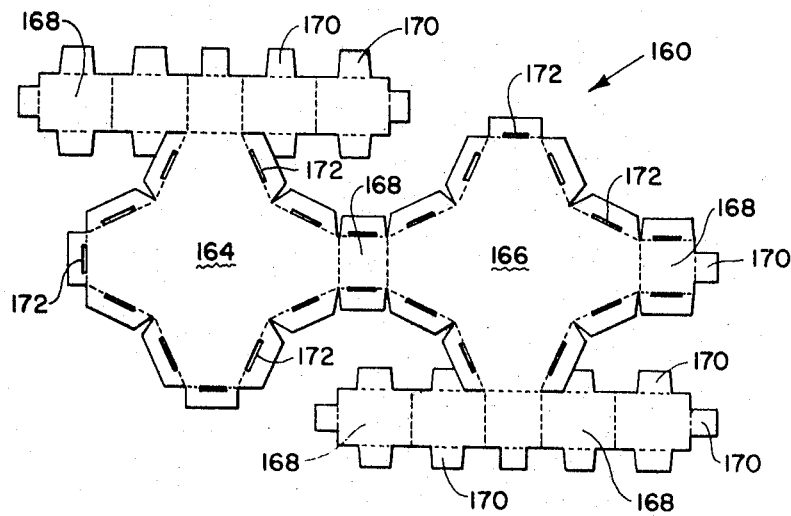
FIG. 13 shows a blank suitable for constructing an actylenic (C≡) carbon atom.
Figure 14:
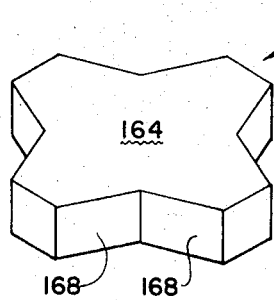
FIG. 14 shows a plan view of the resultant model.

FIG. 13 depicts a blank 160 for forming an acetylenic carbon atom model 162 as is shown in FIG. 14. Blank 160 is formed of a top panel 164, a bottom panel 166, and side panels 168. Tabs 170 mounted along the side panels 168 form, with slots 172, means to hold the model together.

Figure 15:
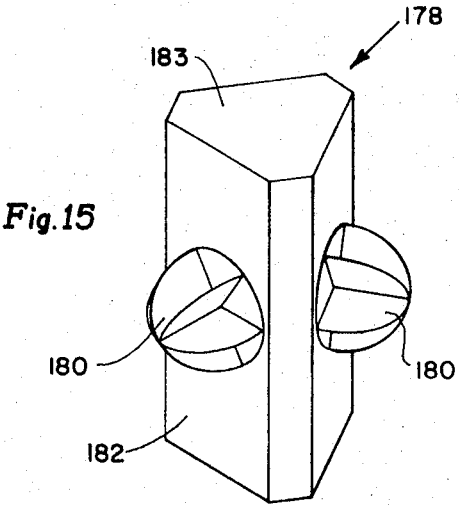
FIG. 15 is a perspective view of a trivalent carbon atom with two hydrogen atoms attached, to illustrate a segment of a molecule.

FIG. 15 shows a model 178 of a segment of a molecule (CH$_2$) formed of two hydrogen atom models 180 and a trigonal carbon atom 182. The hydrogen atom models are constructed, from a differently-sized blank, in the same way that the model of FIG. 9 is constructed. It is fastened to the carbon atom 182 by means of such fasteners shown in FIG. 3, which are attached to each atom model at the surface of contact with each other model.

Figure 16:
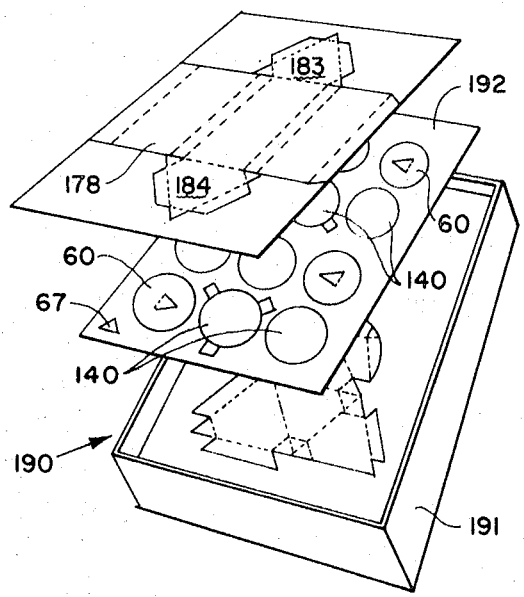
FIG. 16 is a plan view of a kit or set of the flat blanks of the invention.

As illustrated in FIG. 16, a kit, or set, 190 of flat blanks such as 20, 70, 108, 160, 178, etc., may be die cut, scored, imprinted, perforated, etc., in continuous, fanfold form, or as individual sheets of identical rectangular outline, and packaged, as a compact kit in a container 191 at low cost. The kit, or set, 190, includes some sheets 192 from which the attachment tab disks 60 and rotary fastening means 140 may be punched out and assembled.

Unlike the flat models of Osario, and the dished models of Larson, the stereo models of this invention are rigid, non-collapsible structures which I call shell-like, since they are either hollow enclosures, as in FIGS. 2, 6, 14 and 15, or skeletonized, finned structures as in FIG. 9, which, for example, outlines a partly global figure and includes a bottom panel 118. I call the panels 120 and 122, closure panels, because they come together to rigidify the structure, and I designate the panel 32 of FIG. 2, panel 99 of FIG. 4, end panels 183 and 184 of FIG. 15, and side panels 168 of FIG. 13, also as closure panels, since they close in the figure in the manner of a box closure to give strength thereto when the fastening tabs are adhered or inserted in the tab slots.

It is understood, of course, that the models are sized in accordance with atomic and molecular sizes which have been determined by various measuring techniques and are known in the chemical arts.

What is claimed is:

1. A low cost, compact kit for use by students in learning chemical configurations, said kit comprising:
a plurality of identical, individual, flat, planar, rectangular sheets of low-cost, foldable material adapted to lie flatwise in a container,
each said rectangular sheet being visibly divided into panels and flaps by punch-out lines, cut lines and fold lines to represent at least one atom blank of a plurality of different atoms in a set, and to form a three-dimensional, shell-like model of said atom when punched out of said blanks and folded into erected configuration,
fastening means comprising tuck flaps integral with each said blank for permanently fastening together the erected folded panels and flaps thereof to rigidify each said model into a non-collapsible, rigid structure, and
attachment means on at least one face of each said model including an integral flat planar sheet-like tongue folded slightly outwardly from said face into substantial parallelism therewith, the tongue of one said model being slidably engageable and disengageable from under the tongue of another said model for detachable connection of said models.

2. A kit as specified in claim 1 wherein:
said attachment means comprises a plurality of flat disks of said material, each having an integral, triangular, tongue die cut therein and bendable therefrom, said disks being affixed to said models, and forming a tongue receiving pocket therewith; whereby several of said atom models may be assembled into molecules by sliding engagement of the tongue of one said model under the corresponding tongue of another said model and into the tongue receiving pocket of said model.

3. A kit as specified in claim 1, plus:
at least one additional, identical, flat, planar, rectangular blank of said material adapted to lie flatwise in said container as part of said set,
said additional blank being visibly divided into at least one circular disk and into at least one retainer, having disk-retaining tabs on one face thereof spaced angularly around said disk by cut and fold lines, said retainer having said sheet-like tongue of said attachment means formed in the opposite face thereof,
whereby said disk may be adhered to a face of one atom model, said retainer may be mounted on another atom model, to provide relative rotary movement therebetween and the tongue of said retainer may be detachably connected to a face of another atom model.

4. A stereo model set for representing atomic, molecular and radical configurations of chemical structures, and set comprising:
a plurality of individual, rigid, non-collapsible, shell-like structures, each folded from a single blank of bendable, low-cost sheet material to form a three-dimensional figure representing one of the various atoms, and
attachment means including integral flat, planar tongues formed of said sheet material, on juxtaposed faces of said atom models, one said tongue sliding under the other for detachable sliding affixation of one model to the other to form molecular structures.

5. A stereo model set as specificed in claim 4, wherein:
said attachment means includes a retainer formed of said sheet material and having said tongue on one face and retainer tabs on the opposite face and includes a disk rotatable in said tabs and centrally adhered to one said juxtaposed face of said atom models for relative rotational movement of one on the other.

6. Three-dimensional stereo models representative of chemical configurations, said models each comprising a rigid, shell-like structure foldably erected from a one-piece blank of sheet material, said structure having faces thereon, as is appropriate for any particular chemical configuration being represented, and having attachment means in the form of an integral, flat, planar tongue bent outwardly from said sheet material centrally of at least one said face, and having a tongue receiving pocket thereunder for slidably receiving and holding a similar tongue of a second said stereo model therein.

7. A stereo model as defined in claim 6, wherein said attachment means for receiving and holding a second said stereo model is rotational and comprises an inner disk centrally adhered to said face, and having a free unadhered periphery, an outer disk having a plurality of integral, folded tabs overlapping the periphery of said inner disk, for rotation therearound said outer disk having said integral, outwardly bent tongue and pocket centrally thereof, forming means to detachbly receive and hold a second said stereo model thereon.

8. A model as defined in claim 6, wherein said attachment means for receiving and holding tongues are translatory and includes a disk attached peripherally only to a said face, and unadhered centrally theerto to form with said face, a tongue-receiving pocket; said disk having an integral tongue slit therein and bent slightly outwardly therefrom, whereby a tongue on each model is slidably received in a tongue pocket of another model.

9. A model as defined in claim 8, wherein said tongue slit in said disk is angular to form a generally triangular tongue in said disk.

10. A model as defined in claim 6, wherein at least one said face of said model includes a plurality of integral flat planar sheet-like fins spaced thereon, said fins forming means to represent the known effective radius of the chemical configuration being represented.

References Cited

UNITED STATES PATENTS

| | | | |
|---|---|---|---|
| 2,565,823 | 8/1951 | Pool | 46—25 |
| 2,787,073 | 4/1957 | Woolven | 46—31 X |
| 2,839,841 | 6/1958 | Berry | 35—72 X |
| 3,359,657 | 12/1967 | Hedberg | 35—72 |

ROBERT W. MICHELL, Primary Examiner

L. ANTEN, Assistant Examiner

U.S. Cl. X.R.

24—201